(12) United States Patent
Tien

(10) Patent No.: US 9,874,236 B1
(45) Date of Patent: Jan. 23, 2018

(54) POUCH ATTACHMENT LADDER SYSTEM STRAP

(71) Applicant: Condor Outdorr Products, Inc., Irwindale, CA (US)

(72) Inventor: Spencer Tien, Irwindale, CA (US)

( * ) Notice: Subject to any disclaimer, the term of this patent is extended or adjusted under 35 U.S.C. 154(b) by 0 days.

(21) Appl. No.: 15/603,801

(22) Filed: May 24, 2017

(51) Int. Cl.
*F16B 2/08* (2006.01)
*A45F 5/02* (2006.01)

(52) U.S. Cl.
CPC .................. *F16B 2/08* (2013.01); *A45F 5/02* (2013.01); *Y10T 24/141* (2015.01); *Y10T 24/1498* (2015.01); *Y10T 24/153* (2015.01); *Y10T 24/44752* (2015.01)

(58) Field of Classification Search
CPC ........... Y10T 24/44077; Y10T 24/1498; Y10T 24/141; Y10T 24/44752; Y10T 24/44222; Y10T 24/44274; Y10T 24/44538; Y10T 24/44641; F16B 2/08; F16B 13/137; A45F 5/02; B65D 2563/106; B65D 2563/1063; F16L 3/137; A41C 33/041
See application file for complete search history.

(56) References Cited

U.S. PATENT DOCUMENTS

| | | | | | |
|---|---|---|---|---|---|
| 3,551,965 | A | * | 1/1971 | Gordon ................. | A44B 99/00 2/416 |
| 3,842,688 | A | * | 10/1974 | Baginski ............... | B62M 3/083 24/16 PB |
| 4,389,754 | A | * | 6/1983 | Sohma .................... | F16L 3/137 24/16 PB |
| D317,571 | S | * | 6/1991 | Henriksson .................... | D8/394 |
| 5,333,361 | A | * | 8/1994 | Schaede .................. | A41F 9/007 24/16 PB |
| 5,836,053 | A | * | 11/1998 | Davignon ............... | F16L 3/233 24/16 PB |
| 2002/0060275 | A1 | * | 5/2002 | Polad ..................... | F16L 3/137 248/74.3 |
| 2003/0233739 | A1 | * | 12/2003 | Coffey .................. | A45C 13/20 24/302 |
| 2014/0096344 | A1 | * | 4/2014 | Creato ................... | B65D 85/04 24/16 PB |
| 2015/0321813 | A1 | * | 11/2015 | Iannello .................... | A45F 5/02 24/3.1 |

* cited by examiner

Primary Examiner — Robert Sandy
Assistant Examiner — Michael S Lee
(74) Attorney, Agent, or Firm — Clement Cheng

(57) ABSTRACT

A strap includes a base panel. The base panel has a loop retainer and a hook latch. The hook latch has a hook latch tip body extending from a hook latch front face. The hook latch front face is formed on the base panel. The hook latch tip body has a hook latch tip and a hook latch depression formed adjacent to the hook latch tip. A trench fold extends from the base panel. The trench fold forms a hinge to the base panel. A terminal extension extends from the base panel. A terminal extends from the terminal extension. The terminal includes a right terminal prong and a left terminal prong. A terminal opening is formed between the right terminal prong and the left terminal prong.

15 Claims, 3 Drawing Sheets

POUCH ATTACHMENT LADDER SYSTEM STRAP

FIELD OF THE INVENTION

The present invention is in the field of patch attachment ladder system straps.

DISCUSSION OF RELATED ART

The patch attachment ladder system attaches a variety of different accessories to a carrier such as a vest or other type of fabric panel.

SUMMARY OF THE INVENTION

A strap includes a base panel. The base panel has a loop retainer and a hook latch. The hook latch has a hook latch tip body extending from a hook latch front face. The hook latch front face is formed on the base panel. The hook latch tip body has a hook latch tip and a hook latch depression formed adjacent to the hook latch tip. A trench fold extends from the base panel. The trench fold forms a hinge to the base panel. A terminal extension extends from the base panel. A terminal extends from the terminal extension. The terminal includes a right terminal prong and a left terminal prong. A terminal opening is formed between the right terminal prong and the left terminal prong. A terminal tip edge is formed at a tip of the terminal. The terminal opening has a terminal opening upper edge. The terminal opening upper edge engages to the hook latch depression.

The terminal opening upper edge forms an angle less than 90° to the terminal extension flap. The terminal opening upper edge extends upward to a terminal opening upper edge angled face. The terminal opening upper edge angled face is defined between an angled face upper edge and the terminal opening upper edge. The strap can have an upper indent, a middle indent and a lower indent, so that the upper indent is formed on the terminal extension flap, the middle indent is formed on the terminal extension flap, and the lower indent is formed on the base panel.

The loop retainer is generally rectangular and has a loop retainer right inside edge opposing a loop retainer left inside edge, and also a loop retainer front inside edge that opposes a loop retainer rear inside edge. The trench fold has an arc profile with a trench fold thin portion and a trench fold thick portion. The trench fold thin portion is thinner than the trench fold thick portion. A first terminal notch is formed on the terminal and a second terminal notch is formed on the terminal. The first terminal notch and the second terminal notch engage to the loop retainer. The first terminal notch and the second terminal notch engage to the loop retainer while the hook latch engages the terminal opening upper edge. The loop retainer right inside edge and the loop retainer left inside edge respectively engage to the first terminal notch and the second terminal notch.

Figure 1:
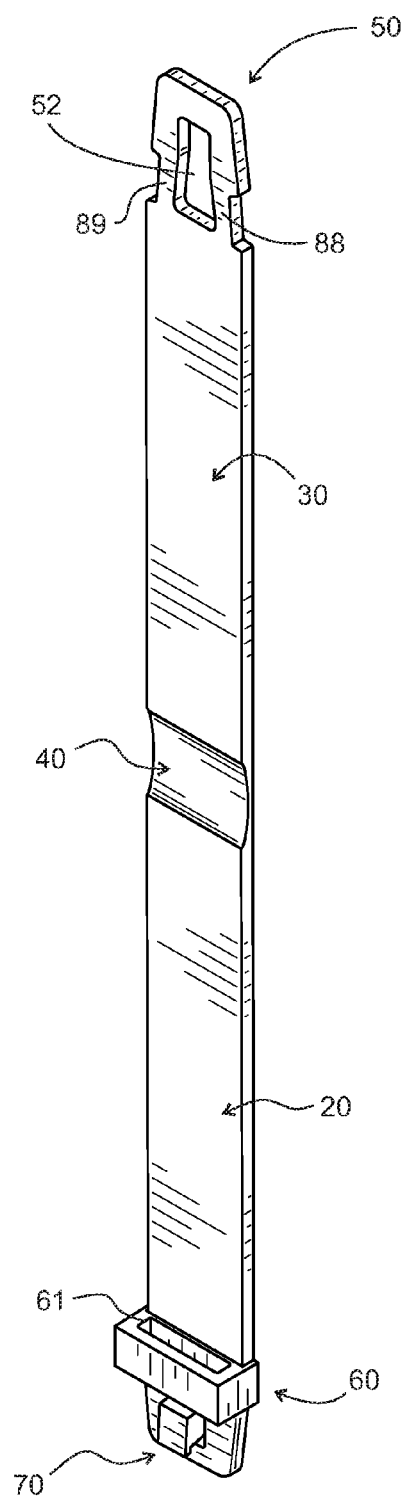
FIG. 1 is a perspective view of the present invention in an extended position.
Figure 2:
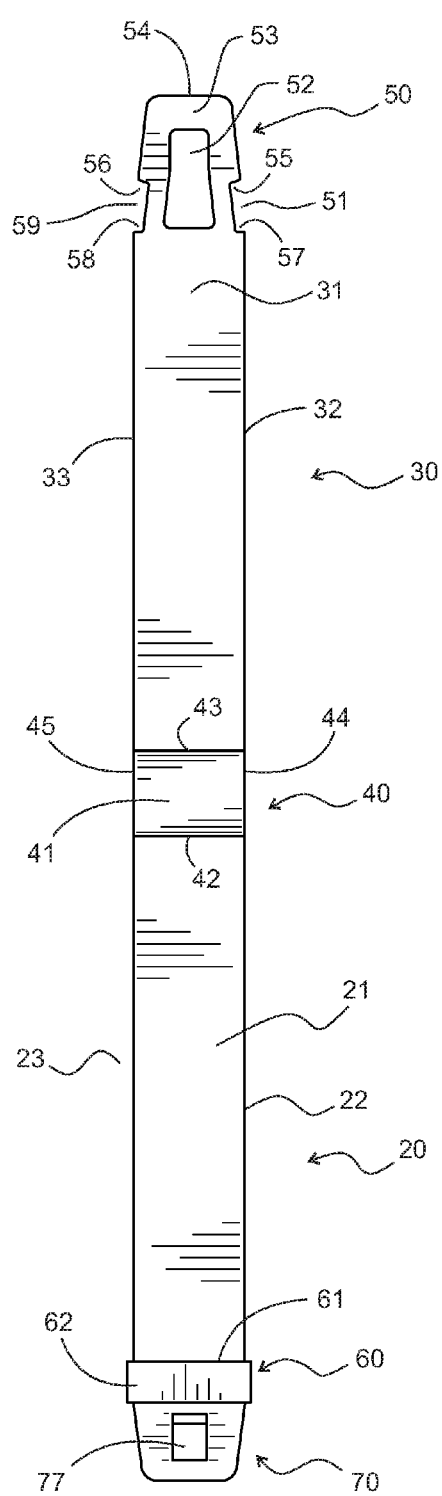
FIG. 2 is a front view of the present invention.
Figure 3:
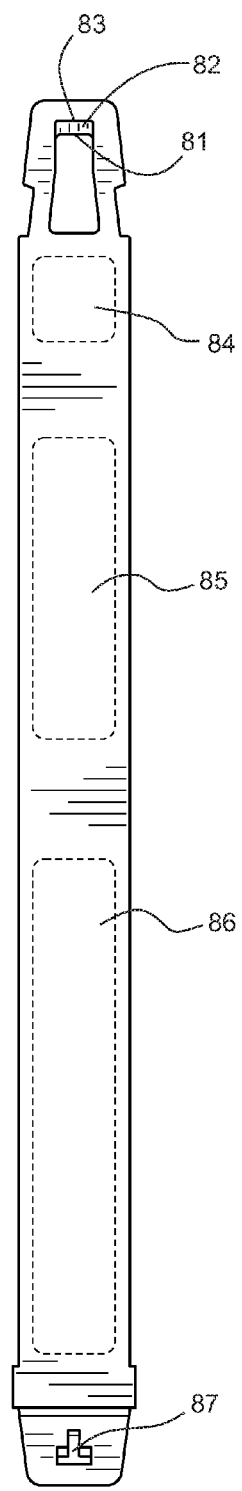
FIG. 3 is a rear view of the present invention.
Figure 4:
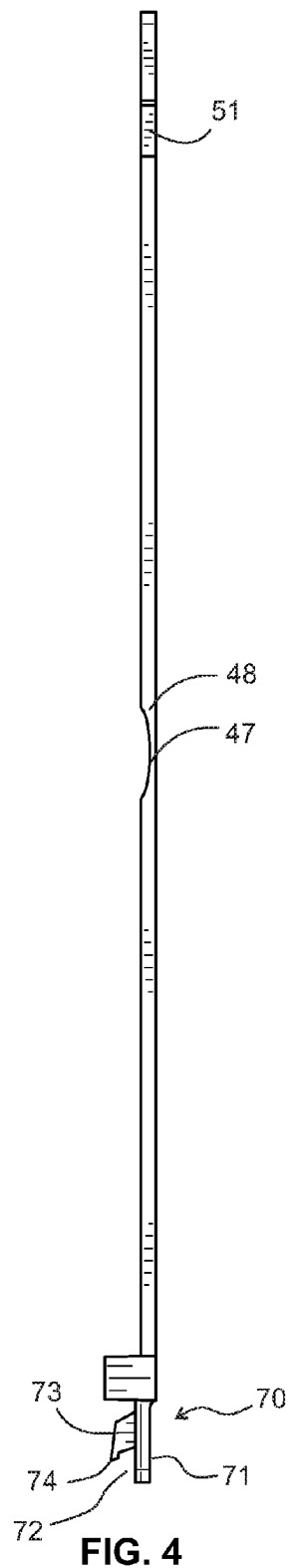
FIG. 4 is a right side view of the present invention.
Figure 5:
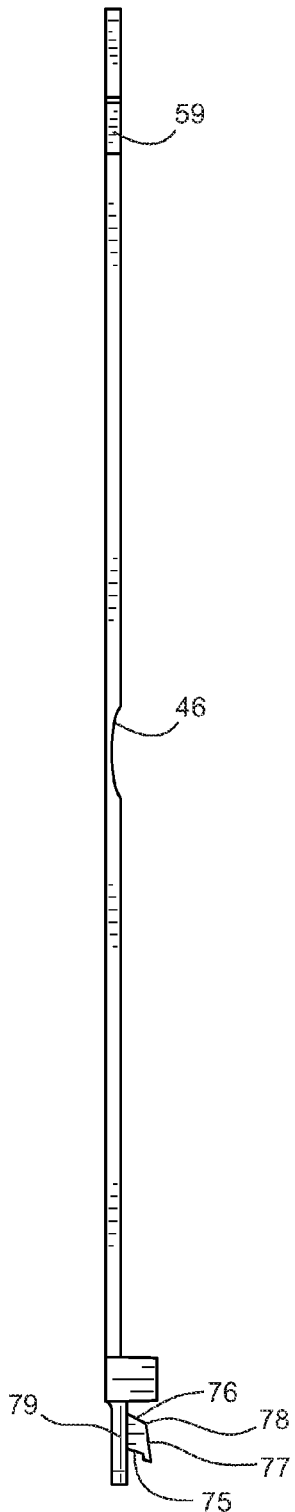
FIG. 5 is a left side view of the present invention.
Figure 6:
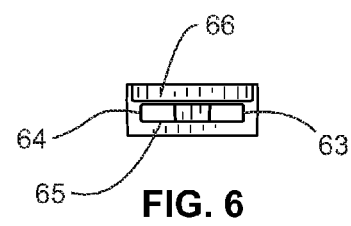
FIG. 6 is a top view of the present invention.
Figure 7:
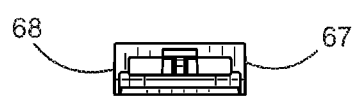
FIG. 7 is a bottom view of the present invention.

The following call list of elements can be a useful guide in referencing the element numbers of the drawings.
20 Base Panel
21 Base Panel Flap
22 Base Panel Right Flap Edge
23 Base Panel Left Flap Edge
30 Terminal Extension
31 Terminal Extension Flap
32 Terminal Extension Flap Right Edge
33 Terminal Extension Flap Left Edge
40 Trench Fold
41 Trench Fold Concave
42 Trench Fold Lower Edge
43 Trench Fold Upper Edge
44 Trench Fold Right Edge
45 Trench Fold Left Edge
46 Trench Fold Arc Profile
47 Trench Fold Thin Portion
48 Trench Fold Thick Portion
50 Terminal
51 First Terminal Notch
52 Terminal Opening
53 Terminal Tip
54 Terminal Tip Edge
55 First Terminal Notch Engaging Edge
56 Second Terminal Notch Engaging Edge
57 First Terminal Notch Retaining Edge
58 Second Terminal Notch Retaining Edge
59 Second Terminal Notch
60 Loop Retainer
61 Loop Opening
62 Loop Front Face
63 Loop Retainer Right Inside Edge
64 Loop Retainer Left Inside Edge
65 Loop Retainer Front Inside Edge
66 Loop Retainer Rear Inside Edge
67 Loop Retainer Right Outside Edge
68 Loop Retainer Left Outside Edge
70 Hook Latch
71 Hook Latch Back Face
72 Hook Latch Front Face
73 Hook Latch Tip Body
74 Hook Latch Tip
75 Hook Latch Depression
76 Hook Latch Extending Face
77 Hook Latch Tip Face
78 Hook Latch Tip Face Angle
79 Hook Latch Flap
81 Terminal Opening Upper Edge
82 Terminal Opening Upper Edge Angled Face
83 Angled Face Upper Edge
84 Upper Indent
85 Middle Indent
86 Lower Indent
87 Hook Latch Opening
88 Right Terminal Prong
89 Left Terminal Prong

DETAILED DESCRIPTION OF THE PREFERRED EMBODIMENT

As seen in the first figure, the present invention is a strap. The strap has a base panel 20 that folds at a trench fold 40 relative to a terminal extension 30. The base panel 20 is parallel to the terminal extension 30 in the strap open position. In a closed position, the base panel 20 is also parallel to the terminal extension 30. The terminal extension 30 rotates 180° and a terminal 50 mounted to a tip of the terminal extension 30 fits into a loop retainer 60 and engages a hook latch 70. The terminal 50 has a terminal opening 52 that engages the hook latch 70. The terminal 50 has a flat planar shape that fits through the loop opening 61. The loop opening 61 is preferably an elongated rectangular opening.

The terminal 50 has a pair of terminal prongs, namely a right terminal prong 88 and a left terminal prong 89. The right terminal prong 88 is parallel to the left terminal prong 89. The pair of terminal prongs extend from the terminal extension 30. The terminal prongs define a terminal opening between the prongs. The terminal 50 has a terminal tip 53 that extends and connects to the pair of terminal prongs. The terminal tip 53 defines an upper boundary of the terminal opening 52. The terminal tip 53 has a terminal tip edge 54 that extends into the loop opening 61. The terminal tip edge 54 can be rounded or have a straight edge along a portion of the terminal tip edge 54.

The terminal 50 also has a first terminal notch 51 and a second terminal notch 59. The first and second terminal notches are formed on a left and right side of the terminal 50. The first terminal notch 51 can be on the right side of the terminal 50 and the second terminal notch 59 can be on the left side of terminal 50. The first terminal notch 51 has a first terminal notch engaging edge 55 and a first terminal notch retaining edge 57. The second terminal notch 59 has a second terminal notch engaging edge 56 and a second terminal notch retaining edge 58. The second terminal notch engaging edge 56 and the first terminal notch engaging edge 55 oppose the first terminal notch retaining edge 57 and the second terminal notch retaining edge 58. When the terminal 50 fits into the loop retainer 60, the first terminal notch engaging edge 55 and the second terminal notch engaging edge 56 engage the loop retainer 61. The terminal 50 can be made as a plastic member that has flexibility and is not rigid to allow insertion even if the width of the terminal 50 is slightly greater than the width of the loop opening 61.

The terminal extension flap 31 has a terminal extension flap right edge 32 and a terminal extension flap left edge 33. The terminal extension flap right edge extends to the first terminal notch retaining edge 57 and the terminal extension flap left edge 33 extends to the second terminal notch retaining edge 58. Preferably, the pair of terminal extension flap edges are straight and parallel to each other to define a strip formed as a panel.

As seen in the second figure, the terminal extension 30 is mounted to the trench fold 40. The trench fold 40 has a trench fold concave 41. The trench fold concave 41 is defined between the trench fold lower edge 42, the trench fold upper edge 43, the trench fold right edge 44 and the trench fold left edge 45. The trench fold concave 41 extends horizontally as shown in the second figure. The trench fold concave 41 has a trench fold arc profile 46. The arc profile 46 defines a trench fold thin portion 47 and a trench fold thick portion 48. The trench fold is connected to the base panel 20. The base panel 20 includes a base panel flap 21 that has a base panel right flap 22 and a base panel left flap 23.

The loop retainer 60 has a loop opening 61 which features a loop front face 62. The loop opening is about the hook latch 70. The hook latch 70 can have angled faces to facilitate connection and retention of the terminal opening 52. For example, the hook latch 70 has a hook latch tip face 77.

As seen in the third figure, the terminal 50 has a terminal opening upper edge 81. A terminal opening upper edge angled face 82 is formed between the terminal opening upper edge 81 and the angled face upper edge 83. Additionally, the terminal extension 30 may have an upper indent 84, a middle indent 85, and a lower indent 86 to facilitate flexibility. Additionally, the hook latch 70 can have a hook latch opening 87.

The loop retainer 60 has a loop retainer rear inside edge 66 opposing a loop retainer front inside edge 65. Additionally, the loop retainer 60 has a loop retainer left inside edge 64 opposing a loop retainer right inside edge 63. The loop retainer 60 has a loop retainer right outside edge 67 that opposes the loop retainer left outside edge 68.

The hook latch 70 is formed below the loop retainer 60. The hook latch 70 includes a hook latch back face 71 and a hook latch front face 72 that opposes the hook latch back face 71. The hook latch tip body 73 is mounted to the hook latch front face 72 and has a hook latch tip 74. The hook latch tip body 73 includes a hook latch tip face 77 that continues to a hook latch tip face angle 78 to a hook latch extending face 76. The hook latch extending face 76 extends to the hook latch front face 72. The hook latch depression 75 is formed by the hook latch tip 74.

The hook latch 70 has a hook latch depression 75 that engages to the terminal opening upper edge 81. The hook latch depression 75 is formed at an angle to the hook latch front face 72. Similarly, the terminal opening upper edge angled face 82 has an angle relative to the terminal extension flap 31. Therefore, the angles can match to provide an angled engagement where the terminal opening upper edge angled face 82 abuts the hook latch depression 75. The hook latch tip face 77 is flat and biases the terminal prongs so that the terminal prongs bend and flex. The right terminal prong 88 and the left terminal prong 89 both bend when the terminal tip edge 54 rides over the hook latch extending face 76, then over the hook latch tip face 77 until the terminal opening upper edge 81 engages to the hook latch tip 74. Preferably, the strap is made of a single piece of flexible resilient plastic. When the terminal opening upper edge 81 engages to the hook latch depression 75, the terminal prongs bias the terminal tip 53 into an engaged position.

While the hook latch 70 is being engaged, the terminal notches are also being engaged. The first terminal notch 51 has a first terminal notch engaging edge 55 that engages to the loop retainer right inside edge 63, and the second terminal notch 59 has a second terminal notch engaging edge 56 that engages to the loop retainer left inside edge 64. The pair of terminal prongs, namely the right terminal prong 88 and the left terminal prong 89 are biased toward each other so that the first terminal notch engaging edge 55 and the second terminal notch engaging edge 56 can clear the loop opening 61.

Therefore, the hook latch 70 engagement bends the terminal prongs along a bending direction that is the same as the direction of the bending of the trench fold 40. Also, the terminal prongs are bent toward each other. The combination of the engagement notches and the hook latch provides a dual connection system. To remove the terminal tip 53 from the loop retainer 60, a user would have to pull up on the terminal tip 53 to clear the hook latch tip 74 while at the same time pressing the right terminal prong 88 toward the left terminal prong 89 so that the first terminal notch engaging edge 55 and the second terminal notch engaging edge 56 disengage from the loop retainer right inside edge 63 and the loop retainer left inside edge 64.

The invention claimed is:
1. A strap comprising:
 a. a base panel, wherein the base panel has a loop retainer and a hook latch, wherein the hook latch has a hook latch tip body extending from a hook latch front face, wherein the hook latch front face is formed on the base panel, wherein the hook latch tip body has a hook latch tip and a hook latch depression formed adjacent to the hook latch tip;
   b. a trench fold extending from the base panel, wherein the trench fold forms a hinge to the base panel;
   c. a terminal extension extending from the base panel; and
   d. a terminal extending from the terminal extension, wherein the terminal includes a right terminal prong and a left terminal prong, wherein a terminal opening is formed between the right terminal prong and the left terminal prong, wherein a terminal tip edge is formed at a tip of the terminal, wherein the terminal opening has a terminal opening upper edge and a terminal opening upper edge angled face, wherein the terminal opening upper edge engages the hook latch depression, and further comprising a first terminal notch formed on the terminal and a second terminal notch formed on the terminal, wherein the first terminal notch and the second terminal notch engage the loop retainer.

2. The strap of claim 1, wherein the terminal opening upper edge angled face forms an angle less than 90° to a terminal extension flap, wherein the terminal opening upper edge extends upward to the terminal opening upper edge angled face, wherein the terminal opening upper edge angled face is defined between an angled face upper edge and the terminal opening upper edge.

3. The strap of claim 1, further including an upper indent, a middle indent and a lower indent, wherein the upper indent is formed on a terminal extension flap, wherein the middle indent is formed on the terminal extension flap, and wherein the lower indent is formed on the base panel.

4. The strap of claim 1, wherein the loop retainer is generally rectangular and has a loop retainer right inside edge opposing a loop retainer left inside edge, and also a loop retainer front inside edge that opposes a loop retainer rear inside edge.

5. The strap of claim 1, wherein the trench fold has an arc profile with a trench fold thin portion and a trench fold thick portion, wherein the trench fold thin portion is thinner than the trench fold thick portion.

6. The strap of claim 1, wherein the first terminal notch and the second terminal notch engage to the loop retainer while the hook latch engages the terminal opening upper edge.

7. The strap of claim 6, wherein the terminal opening upper edge forms an angle less than 90° to the terminal extension flap, wherein the terminal opening upper edge extends upward to a terminal opening upper edge angled face, wherein the terminal opening upper edge angled face is defined between an angled face upper edge and the terminal opening upper edge.

8. The strap of claim 6, further including an upper indent, a middle indent and a lower indent, wherein the upper indent is formed on the terminal extension flap, wherein the middle indent is formed on the terminal extension flap, and wherein the lower indent is formed on the base panel.

9. The strap of claim 6, wherein the loop retainer is generally rectangular and has a loop retainer right inside edge opposing a loop retainer left inside edge, and also a loop retainer front inside edge that opposes a loop retainer rear inside edge.

10. The strap of claim 6, wherein the trench fold has an arc profile with a trench fold thin portion and a trench fold thick portion, wherein the trench fold thin portion is thinner than the trench fold thick portion.

11. The strap of claim 6, wherein the loop retainer right inside edge and the loop retainer left inside edge respectively engage to the first terminal notch and the second terminal notch.

12. The strap of claim 11, wherein the terminal opening upper edge forms an angle less than 90° to the terminal extension flap, wherein the terminal opening upper edge extends upward to a terminal opening upper edge angled face, wherein the terminal opening upper edge angled face is defined between an angled face upper edge and the terminal opening upper edge.

13. The strap of claim 11, further including an upper indent, a middle indent and a lower indent, wherein the upper indent is formed on the terminal extension flap, wherein the middle indent is formed on the terminal extension flap, and wherein the lower indent is formed on the base panel.

14. The strap of claim 11, wherein the loop retainer is generally rectangular and has a loop retainer right inside edge opposing a loop retainer left inside edge, and also a loop retainer front inside edge that opposes a loop retainer rear inside edge.

15. The strap of claim 11, wherein the trench fold has an arc profile with a trench fold thin portion and a trench fold thick portion, wherein the trench fold thin portion is thinner than the trench fold thick portion.

\* \* \* \* \*